UNITED STATES PATENT OFFICE.

PAUL HEIN, OF ESSEN-RÜTTENSCHEID, GERMANY, ASSIGNOR, BY MESNE ASSIGNMENTS, TO THE CHEMICAL FOUNDATION, INC., A CORPORATION OF DELAWARE.

METHOD OF REFINING RAW WOOD-PULP LIQUOR.

1,344,691.     Specification of Letters Patent.     Patented June 29, 1920.

No Drawing. Application filed October 24, 1916, Serial No. 127,448. Renewed December 9, 1919. Serial No. 343,643.

*To all whom it may concern:*

Be it known that I, PAUL HEIN, a subject of the King of Prussia, and residing at Essen-Ruttenscheid, in the Kingdom of Prussia and German Empire, have invented certain new and useful Improvements in Methods of Refining Raw Wood-Pulp Liquor, of which the following is a specification.

The raw wood-pulp liquor, that is the residual lye, obtained from the sulfite cellulose manufacture contains a considerable percentage of calcium compounds dissolved therein and also free sulfuric acid. On account of the latter it is not permitted to discharge the raw waste liquor into a river and for further use in industry it is necessary to first concentrate the liquor by evaporation, which, when done with the liquor in its raw state, causes the calcium compounds therein, to precipitate and produce incrustations in the concentrating apparatus while at the same time the free acid exerts a deleterious action on the metallic parts of the same.

It is therefore very important to free the raw liquor from both the acid and the dissolved calcium-compounds, no matter whether the liquor is intended for subsequent use *e. g.* as an agglutinant or the like in various branches of industry or whether it is to be discharged as useless into a river or any public water.

It has been proposed already to bind the free sulfurous acid by adding an alkali or an alkaline earth to the raw liquor and, on the other hand, it has been suggested to precipitate the calcium compounds in solution by adding an acid, such as sulfuric acid, to the liquor whereby the raw liquor can be rendered free from the detrimental constituents by two separate actions or processes.

My invention relates to a new method of refining raw wood-pulp liquor by eliminating therefrom the said detrimental constituents by a single action or process. My invention consists in treating the liquor with fuel ashes, *e. g.* wood ashes or ashes obtained from peat, or the like. The ashes are added to and then mixed with the liquor by stirring or any other appropriate manner, and subsequently one separates the liquor from the solid constituents of the mixture. The ashes act to both bind the free acid and precipitate the calcium-compounds in solution. The separated liquor is, in all practical regards free from calcium-compounds and contains no free acid, its reaction being alkaline.

The new method is in comparison with the former practice economical both as regards work and time and also as regards the cheapness of the waste-substances, such as ashes used therein.

What I claim is:

1. The method of refining raw wood-pulp liquor which consists in adding thereto and stirring together therewith fuel ashes containing alkali-metal carbonates.

2. The method of refining raw wood-pulp liquor which consists in adding thereto and stirring together therewith wood ashes.

3. The method of refining raw wood-pulp liquor which consists in adding thereto and stirring together therewith a substance containing an alkali-metal carbonate.

In testimony whereof I have affixed my signature in presence of two witnesses.

PAUL HEIN.

Witnesses:
    HENRY HASPER,
    BERNHARD GRÄTZ.